United States Patent
Watanabe et al.

(10) Patent No.: US 10,066,748 B2
(45) Date of Patent: Sep. 4, 2018

(54) VEHICLE PARKING LOCK DEVICE

(71) Applicant: HONDA MOTOR CO., LTD., Tokyo (JP)

(72) Inventors: Nobuyuki Watanabe, Wako (JP); Yutaka Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 15/159,808

(22) Filed: May 20, 2016

(65) Prior Publication Data
US 2016/0341311 A1   Nov. 24, 2016

(30) Foreign Application Priority Data

May 22, 2015   (JP) ................... 2015-104131

(51) Int. Cl.
| | |
|---|---|
| F16H 63/34 | (2006.01) |
| F16D 63/00 | (2006.01) |
| B60T 1/06 | (2006.01) |
| B60T 1/00 | (2006.01) |
| F16D 127/02 | (2012.01) |
| F16H 61/00 | (2006.01) |
| F16H 63/38 | (2006.01) |

(52) U.S. Cl.
CPC .......... F16H 63/3483 (2013.01); B60T 1/005 (2013.01); B60T 1/062 (2013.01); F16D 63/006 (2013.01); F16H 63/3425 (2013.01); *F16D 2127/02* (2013.01); *F16H 61/0021* (2013.01); *F16H 63/38* (2013.01); *F16H 2061/0034* (2013.01)

(58) Field of Classification Search
None
See application file for complete search history.

(56) References Cited

U.S. PATENT DOCUMENTS

| | | | |
|---|---|---|---|
| 2009/0071275 A1* | 3/2009 | Yoshioka | ............... B60T 1/005 74/335 |
| 2011/0147141 A1* | 6/2011 | Schnittger | ............ B60T 13/662 188/152 |

(Continued)

FOREIGN PATENT DOCUMENTS

JP    2008-503695    2/2008

*Primary Examiner* — Ramya Prakasam Burgess
*Assistant Examiner* — Timothy Hannon
(74) *Attorney, Agent, or Firm* — Mori & Ward, LLP (57) ABSTRACT

A vehicle parking lock device includes an automatic transmission to transmit a drive force from a drive source. The automatic transmission includes a hydraulic actuator and a hydraulic circuit. The hydraulic actuator restricts rotation of a parking gear. The hydraulic circuit includes an accumulator and a line pressure controller. Pressure is accumulated in the accumulator with line pressure. Hydraulic pressure accumulated in the accumulator is supplied to the hydraulic actuator so that the hydraulic actuator is in a parking lock activation position when the drive source has stopped. Pressure in the accumulator is accumulated with the line pressure when the drive source has started. The line pressure controller boosts the line pressure to a level higher than or equal to a pressure necessary to fully fill up the accumulator in a case where a predetermined condition is satisfied after the drive source has started.

12 Claims, 9 Drawing Sheets

(56) References Cited

U.S. PATENT DOCUMENTS

2011/0198190 A1* 8/2011 Steinhauser ........ F16H 63/3491
                                              192/219.5
2012/0160631 A1* 6/2012 Bauer ................. F16H 63/3483
                                              192/219.5

* cited by examiner

VEHICLE PARKING LOCK DEVICE

CROSS-REFERENCE TO RELATED APPLICATIONS

The present application claims priority under 35 U.S.C. § 119 to Japanese Patent Application No. 2015-104131, filed May 22, 2015, entitled "Vehicle Parking Lock Device." The contents of this application are incorporated herein by reference in their entirety.

BACKGROUND

1. Field

The present invention relates to a vehicle parking lock device.

2. Description of the Related Art

Japanese Unexamined Patent Application Publication (Translation of PCT Application) No. 2008-503695 discloses a parking lock device that prevents movements of the vehicle by restricting rotation of an output shaft of an automatic transmission, the parking lock device operated by a hydraulic actuator activated by a hydraulic circuit.

SUMMARY

According to a one aspect of the present invention, a vehicle parking lock device includes an automatic transmission. The automatic transmission outputs a drive force from a drive source while changing speed. The automatic transmission includes a hydraulic actuator and a hydraulic circuit. The hydraulic actuator is capable of restricting rotation of a parking gear coupled to a wheel. The hydraulic circuit is configured to control operation of the hydraulic actuator. The hydraulic circuit includes an accumulator and a line pressure control unit. The pressure is accumulated in the accumulator with line pressure generated by running of the drive source. When the drive source is stopped in a running state, the hydraulic circuit supplies hydraulic pressure accumulated in the accumulator to the hydraulic actuator to operate the hydraulic actuator to a parking lock activation position. When the drive source is started in a stopped state, the hydraulic circuit accumulates pressure in the accumulator with the line pressure. The line pressure control unit is capable of adjusting the line pressure. When a predetermined condition is satisfied after the drive source is started in the stopped state, the line pressure control unit boosts the line pressure to a level higher than or equal to a pressure necessary to fully fill up the accumulator.

According to another aspect of the present invention, a vehicle parking lock device includes an automatic transmission. The automatic transmission transmits a drive force from a drive source. The automatic transmission includes a hydraulic actuator and a hydraulic circuit. The hydraulic actuator restricts rotation of a parking gear coupled to a wheel. The hydraulic actuator is controlled via the hydraulic circuit. The hydraulic circuit includes an accumulator and a line pressure controller. Pressure is accumulated in the accumulator with line pressure generated by driving the drive source. Hydraulic pressure accumulated in the accumulator is supplied to the hydraulic actuator so that the hydraulic actuator is in a parking lock activation position when the drive source has stopped. Pressure in the accumulator is accumulated with the line pressure when the drive source has started. The line pressure controller boosts the line pressure to a level higher than or equal to a pressure necessary to fully fill up the accumulator in a case where a predetermined condition is satisfied after the drive source has started.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, embodiments of the present disclosure are described with reference to FIGS. 1 to 9.

Figure 1:
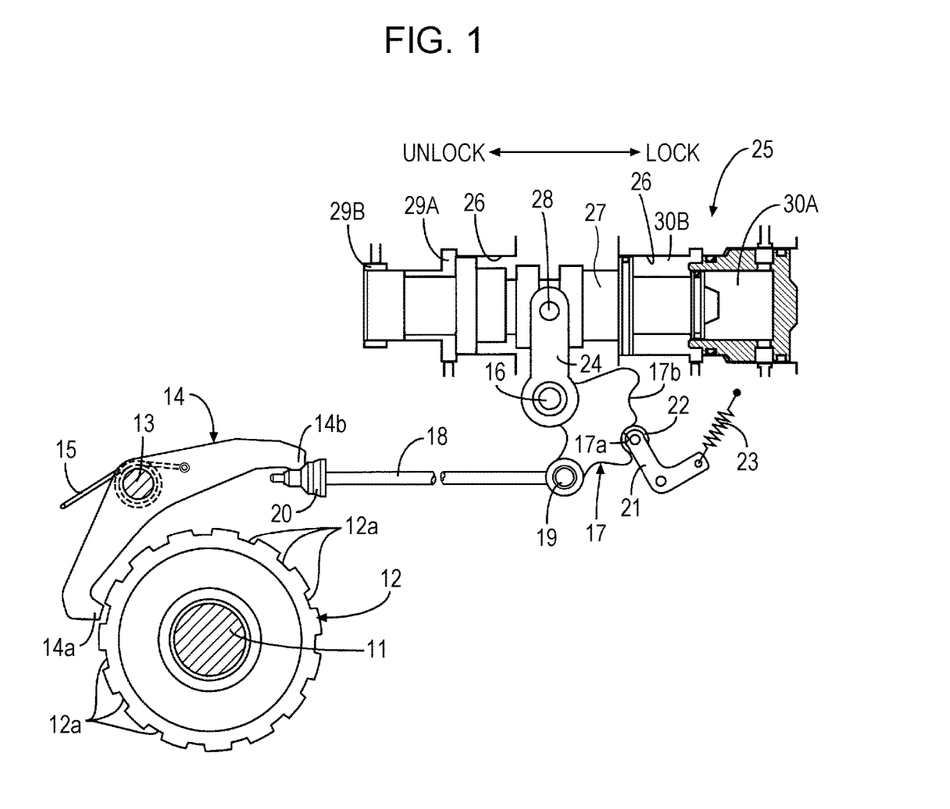
FIG. 1 illustrates a structure of a parking lock device.

First, structure of a parking lock device is described with reference to FIG. 1.

A parking gear 12 is fixed on a transmission shaft 11 of an automatic transmission, and a locking claw 14*a* provided at one end of a parking pawl 14 supported by a support shaft 13 is biased by a spring 15 in a direction detaching from a tooth groove 12*a* of the parking gear 12. One end of a parking rod 18 is supported by a pin 19 on a detent plate 17 supported by a support shaft 16, and a cone-shaped cam 20 provided at another end of the parking rod 18 comes in contact with a cam follower 14*b* provided on another end of the parking pawl 14. A detent roller 22 provided on one end of a swingable arm 21 is biased by a spring 23 in a direction where the detent roller 22 is engaged with either one of two concave sections 17*a*, 17*b* of the detent plate 17. A link 24 supported by the support shaft 16 and swingable integrally with the detent plate 17 is coupled to a hydraulic actuator 25.

The hydraulic actuator 25 includes a piston 27 slidably fitted in a cylinder 26, and the link 24 is coupled with the piston 27 via a pin 28. A first locking oil chamber 29A and a second locking oil chamber 29B for operating the piston 27 in a direction (to the right) where the parking lock is activated are formed on the left end side of the cylinder 26, and a first unlocking oil chamber 30A and a second unlocking oil chamber 30B for operating the piston 27 in a direction (to the left) where the parking lock is released are formed on the right end side of the cylinder 26.

When hydraulic pressure is supplied to the first locking oil chamber 29A and the second locking oil chamber 29B, the piston 27 is operated to the right, motion of the piston 27 pushes up the cam follower 14b of the parking pawl 14 via the link 24, the detent plate 17, the parking rod 18, and the cam 20, the parking pawl 14 swings against a resilient force of the spring 15 and causes the locking claw 14a to engage with one of the tooth grooves 12a of the parking gear 12, and thereby parking lock is activated and movement of the vehicle is suppressed. When the parking lock is in the activated state, the detent roller 22 is engaged with the concave section 17b of the detent plate 17, and the state is maintained in a stable manner.

Meanwhile, when hydraulic pressure is supplied to the first unlocking oil chamber 30A and the second unlocking chamber 30B, the piston 27 is operated to the left, the locking claw 14a of the parking pawl 14 detaches from tooth grooves 12a of the parking gear 12, and thereby the parking lock is released and movement of the vehicle becomes possible. When the parking lock is in the released state, the detent roller 22 is engaged with the concave section 17a of the detent plate 17, and the state is maintained in a stable manner.

Figure 2:
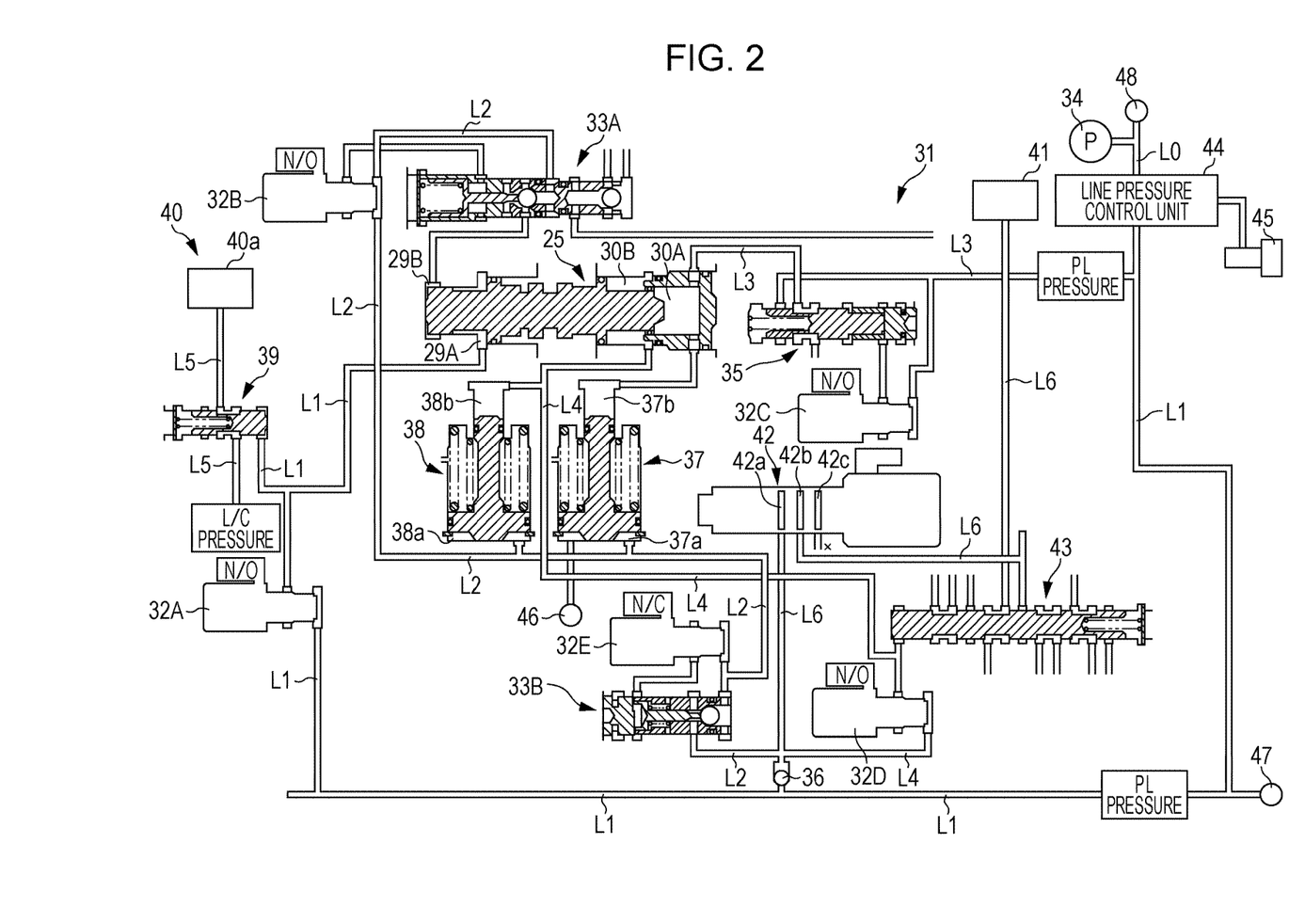
FIG. 2 is a hydraulic circuit diagram of the parking lock device.

Next, a hydraulic circuit 31 configured to control operation of the hydraulic actuator 25 is described with reference to FIG. 2.

The hydraulic circuit 31 includes an ON/OFF type solenoid valve 32A configured to supply line pressure to a first locking oil chamber 29A of the hydraulic actuator 25, the line pressure supplied from a hydraulic pump 34 driven by an engine being a drive source to oil passages L1, L3 via an oil passage L0 and a line pressure control unit 44; and an ON/OFF type solenoid valve 32B configured to supply a line pressure of an oil passage L2 to a second locking oil chamber 29B of the hydraulic actuator 25, the oil passage L2 coupled to the downstream side of the oil passage L1 via a check valve 36. When opened, the solenoid valve 32A supplies line pressure directly to the first locking oil chamber 29A. Meanwhile, when opened, the solenoid valve 32B causes a first ball valve 33A to open. Both of the solenoid valve 32A and the solenoid valve 32B are normal open type solenoid valves.

A hydraulic circuit 31 includes an ON/OFF type solenoid valve 32C configured to supply line pressure of an oil passage L3 to the first unlocking oil chamber 30A of the hydraulic actuator 25, and an ON/OFF type solenoid valve 32D configured to supply line pressure of an oil passage L4 disposed downstream of the check valve 36 to the second unlocking oil chamber 30B of the hydraulic actuator 25. When opened, the solenoid valve 32D supplies line pressure directly to the second unlocking oil chamber 30B. Meanwhile, when opened, the solenoid valve 32C operates a spool of a parking inhibit valve 35 to the left and thereby supplies line pressure to the first unlocking oil chamber 30A, and when closed, the solenoid valve 32C operates the spool to the right and thereby drains line pressure of the first unlocking oil chamber 30A. Both of the solenoid valve 32C and the solenoid valve 32D are normal open type solenoid valves.

An accumulation chamber 37a of a first accumulator 37 and an accumulation chamber 38a of a second accumulator 38 are connected to the oil passage L2 between the check valve 36 and the solenoid valve 32B. A rear chamber 37b of the first accumulator 37 communicates with the first unlocking oil chamber 30A, and a rear chamber 38b of the second accumulator 38 communicates with the second unlocking oil chamber 30B. A second ball valve 33B configured to be opened and closed by an ON/OFF type solenoid valve 32E is disposed among the first accumulator 37, the second accumulator 38 and the check valve 36. When opened, the solenoid valve 32E causes the second ball valve 33B to open to increase the flow rate of the oil. The solenoid valve 32E is a normal close type solenoid valve.

A lockup clutch shift valve 39 is coupled to the oil passage L1 disposed downstream of the solenoid valve 32A, and lockup clutch pressure of an oil passage L5 is supplied to a lockup clutch 40a of a torque converter 40 serving as a starting mechanism via the lockup clutch shift valve 39.

A hydraulic brake 41, which is a hydraulic engaging device for transmission, is coupled to an oil passage L6 disposed downstream of the check valve 36, and a linear solenoid valve 42 and a brake cut valve 43 are disposed in the oil passage L6. The brake cut valve 43 is opened and closed by the solenoid valve 32D. The linear solenoid valve 42 includes an IN port 42a, an OUT port 42b, and a drain port 42c. The linear solenoid valve 42 is configured to adjust hydraulic pressure received from the IN port 42a to output through the OUT port 42b or drain through the drain port 42c.

A line pressure control unit 44 including a regulator valve is disposed downstream of the oil passage L0 extending from the hydraulic pump 34. Line pressure outputted by the line pressure control unit 44 to the oil passages L1, L3 can be controlled with a linear solenoid valve 45. Line pressure outputted by the line pressure control unit 44 in a normal operation state is set slightly higher than a pressure necessary to fully fill up the first accumulator 37 and the second accumulator 38. However, when a predetermined condition described later is satisfied, line pressure outputted by the line pressure control unit 44 is controlled so as to be further higher than the line pressure in the normal operation state.

Hydraulic pressure accumulated in the first accumulator 37 and the second accumulator 38 is detectable by an accumulator pressure sensor 46 disposed in the first accumulator 37, for example, and the line pressure is detectable by a line pressure sensor 47 disposed in the oil passage L1, for example. Oil temperature of hydraulic oil of the automatic transmission is detectable by an oil temperature sensor 48 disposed in the oil passage L0, for example.

Next, actions in the embodiments of the present disclosure including the above configuration are described.

Figure 3:
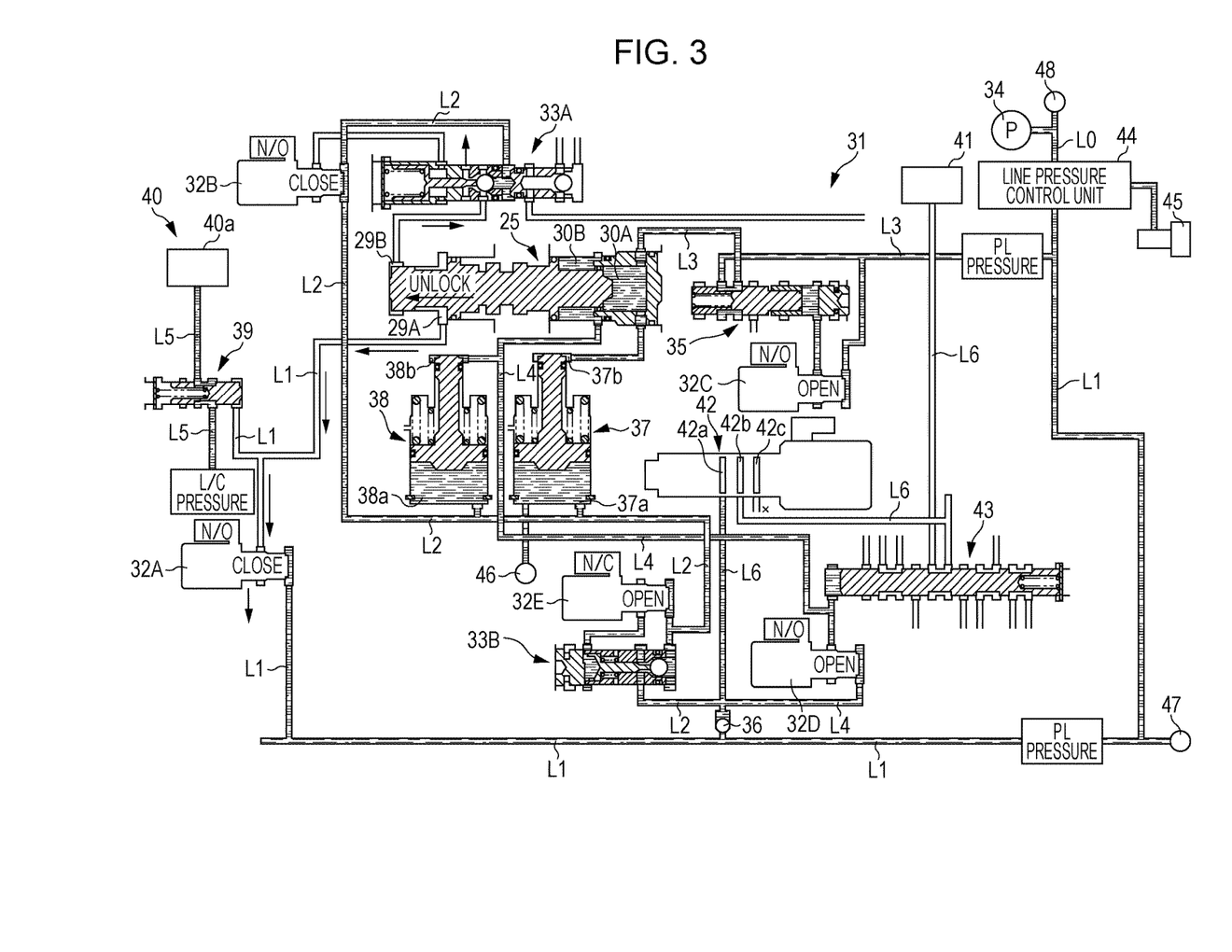
FIG. 3 is a diagram illustrating actions taking place when the vehicle is traveling in a D range or an R range (with parking lock released).

When the vehicle is running at a predetermined gear position with the shift lever positioned in the D range or the R range, line pressure generated by the hydraulic pump 34 driven by the engine is transmitted to the oil passages L1 and L3 from the oil passage L0, and hydraulic pressure of the oil passage L1 passes through the check valve 36 and is transmitted to the oil passages L2, L4 and L6. When the normal close type solenoid valve 32E is energized to open, the second ball valve 33B opens in response and thereby line pressure is supplied to the oil passage L2, and hydraulic pressure is accumulated in the accumulation chamber 37a of the first accumulator 37 and the accumulation chamber 38b of the second accumulator 38.

The normal open type solenoid valve 32C and the normal open type solenoid valve 32D are opened when deenergized. With the solenoid valve 32C opened, the spool of the parking inhibit valve 35 is operated to the left, and thereby line pressure of the oil passage L3 is transmitted to the first unlocking oil chamber 30A of the hydraulic actuator 25 via the parking inhibit valve 35. At the same time, with the solenoid valve 32D opened, line pressure of the oil passage L4 is transmitted to the second unlocking oil chamber 30B of the hydraulic actuator 25.

Meanwhile, the normal open type solenoid valve 32A and the normal open type solenoid valve 32B are closed when energized. With the solenoid valve 32A closed, oil in the first locking oil chamber 29A of the hydraulic actuator 25 is drained from the solenoid valve 32A through the path indicated by arrow. With the solenoid valve 32B closed, the first ball valve 33A is closed and thereby oil in the second locking oil chamber 29B of the hydraulic actuator 25 is drained from the first ball valve 33A through the path indicated by arrow. As a result, the piston 27 of the hydraulic actuator 25 is operated to the left to release parking lock.

Although flow rate of oil allowed to pass through the solenoid valve 32B is relatively small, flow rate of oil allowed to pass through the first ball valve 33A opened and closed by the solenoid valve 32B is relatively large. Thus, operational responsiveness of the hydraulic actuator 25 may be enhanced by interposing the first ball valve 33A.

As described above, when the vehicle is traveling, the solenoid valves 32A and 32B are closed and the solenoid valves 32C and 32D are closed such that the hydraulic actuator 25 is operated to the unlocking position to release parking lock. The hydraulic actuator 25 includes two locking oil chambers including first locking oil chamber 29A and second locking oil chamber 29B, and two unlocking oil chambers including the first unlocking oil chamber 30A and the second unlocking oil chamber 30B. Therefore, even when hydraulic pressure is not supplied to the first unlocking oil chamber 30A or the second unlocking oil chamber 30B due to fixing of either one of the solenoid valves 32C and 32D in the close state or even when hydraulic pressure is supplied to the first locking oil chambers 29A or 29B due to fixing of either one of the solenoid valves 32A and 32B in the open state, the hydraulic actuator 25 may be operated to the unlocking position without a trouble to secure redundancy.

The solenoid valve 32C is configured to open at a first predetermined gear position, and the solenoid valve 32D is configured to open at a second predetermined gear position. The first and second predetermined gear positions partly overlap each other. Therefore, depending on then established gear positions, line pressure may be supplied only to the first unlocking oil chamber 30A, or only to the second unlocking oil chamber 30B, or to both of the first unlocking oil chamber 30A and the second unlocking oil chamber 30B. However, in any case, the piston 27 of the hydraulic actuator 25 is operated to the left to release parking lock without a trouble. At the overlapping gear position, line pressure is supplied to both of the first unlocking oil chamber 30A and the second unlocking oil chamber 30B. Therefore, even when supply of line pressure is stopped due to a failure of the solenoid valve 32C or the solenoid valve 32D, parking lock is maintained in the operation release state and redundancy is enhanced.

Figure 4:
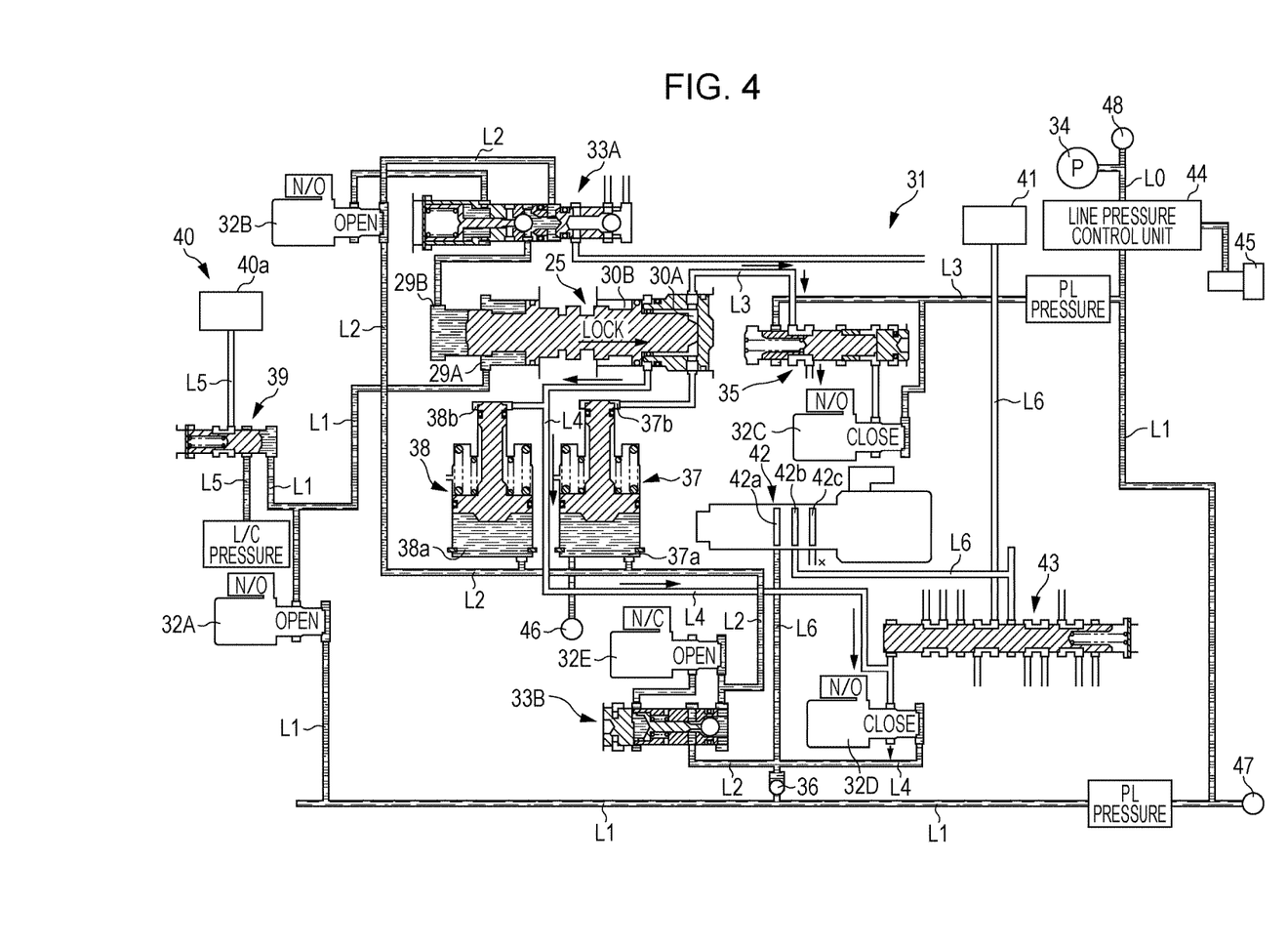
FIG. 4 is a diagram illustrating actions taking place when the vehicle is stopped (with parking lock activated) in a P range (with engine being ON).

As illustrated in FIG. 4, when the vehicle is stopped with the shift lever operated to the P range while the engine is running, the solenoid valves 32A and 32B are deenergized to open and the solenoid valves 32C and 32D are energized to close. With the solenoid valve 32A opened, line pressure of the oil passage L1 is transmitted to the first locking oil chamber 29A of the hydraulic actuator 25, and with the solenoid valve 32B opened, the first ball valve 33A is opened and line pressure of the oil passage L2 is transmitted to the second locking oil chamber 29B of the hydraulic actuator 25.

Meanwhile, with the solenoid valve 32C closed, oil in the first unlocking oil chamber 30A of the hydraulic actuator 25 is drained from the parking inhibit valve 35 through the path indicated by arrow, and with the solenoid valve 32D closed, oil in the second unlocking oil chamber 30B of the hydraulic actuator 25 is drained from the solenoid valve 32D through the path indicated by arrow. As a result, the piston 27 of the hydraulic actuator 25 is operated to the right to activate parking lock.

As described above, when the shift lever is operated to the P range while the engine is running, the solenoid valves 32A and 32B are opened, the solenoid valves 32C and 32D are closed, and thereby the hydraulic actuator 25 is operated to the locking position. The hydraulic actuator 25 includes two locking oil chambers, that is, the first locking oil chamber 29A and the second locking oil chamber 29B and two unlocking oil chambers, that is, the first unlocking oil chamber 30A and the second unlocking oil chamber 30B. Therefore, even when hydraulic pressure is supplied to the first unlocking oil chamber 30A or the second unlocking oil chamber 30B due to fixing of either one of the solenoid valves 32C and 32D in the open state or even when hydraulic pressure is not supplied to the first locking oil chambers 29A or the second locking oil chamber 29B due to fixing of either one of the solenoid valves 32A and 32B in the close state, the hydraulic actuator 25 may be operated to the locking position without a trouble, and the redundancy may be secured.

Figure 5:
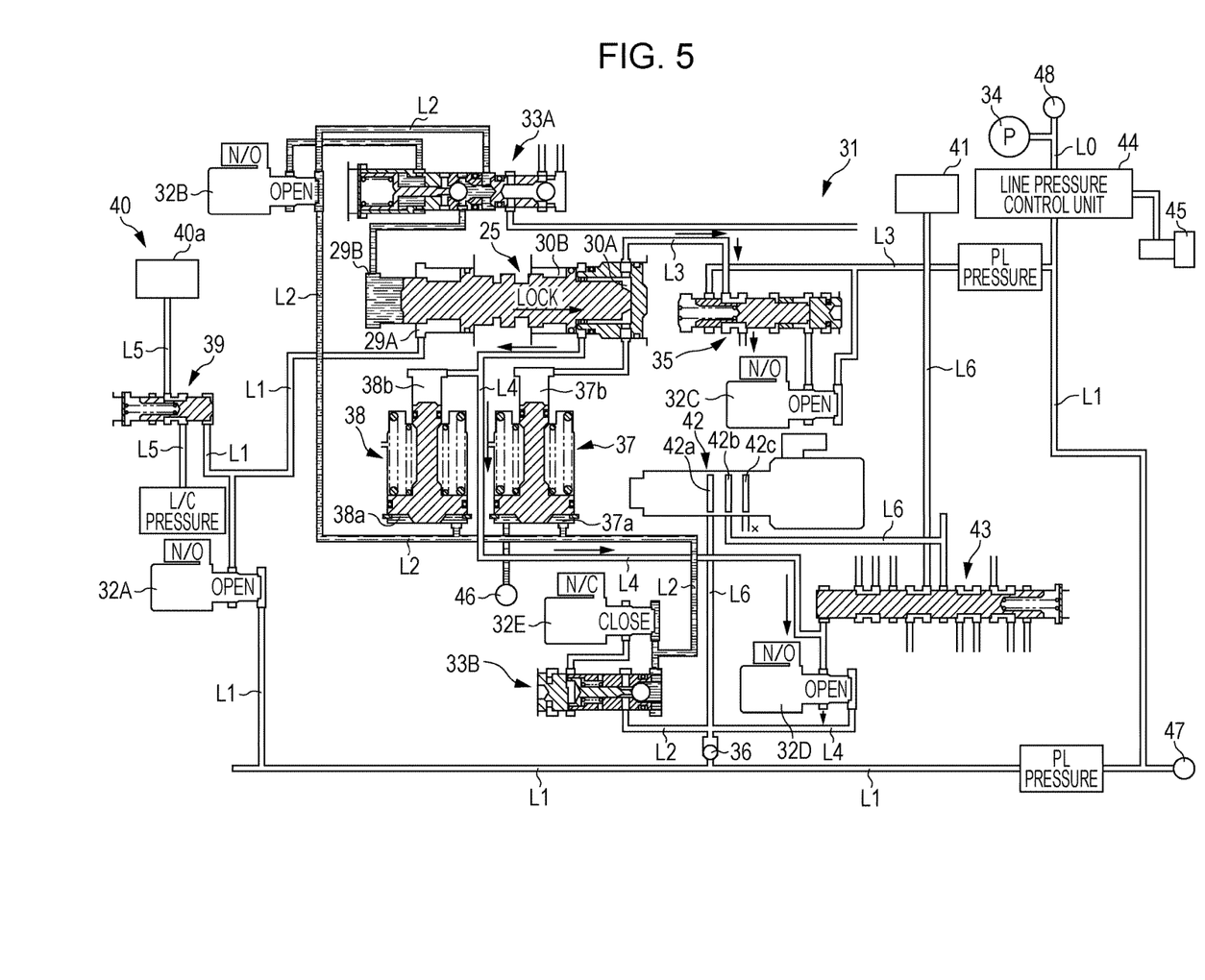
FIG. 5 is a diagram illustrating actions taking place when the engine is turned OFF (with parking lock activated).

As illustrated in FIG. 5, when ignition is turned off, engine stops, and thereby line pressure disappears and gear position automatically shifts to the P range by shift-by-wire control. In this case, according to the present embodiment, even when line pressure disappears due to engine stop, parking lock may be activated by hydraulic pressure accumulated in the first accumulator 37 and the second accumulator 38 without a trouble.

That is, when ignition is turned off, all of the normal open type solenoid valves 32A, 32B, 32C and 32D are deenergized to open, and the normal close type solenoid valve 32E is deenergized to close. Even when line pressure disappears, the second ball valve 33B is closed due to closure of the solenoid valve 32E, and thereby hydraulic pressure accumulated in the first accumulator 37 and the second accumulator 38 is maintained without leakage.

Then, with the solenoid valve 32B opened, hydraulic pressure of the first accumulator 37 and the second accumulator 38 is transmitted to the second locking oil chamber 29B of the hydraulic actuator 25 via the opened second ball valve 33B. Meanwhile, with the solenoid valve 32C closed, oil in the first unlocking oil chamber 30A of the hydraulic actuator 25 is drained from the parking inhibit valve 35 through the path indicated by arrow, and with the solenoid valve 32D closed, oil in the second unlocking oil chamber 30B of the hydraulic actuator 25 is drained from the solenoid valve 32D through the path indicated by arrow. As a result, the piston 27 of the hydraulic actuator 25 is operated to the right to activate parking lock.

As described above, even when line pressure disappears due to turn-off of ignition, parking lock may be operated with hydraulic pressure accumulated in the first accumulator 37 and the second accumulator 38 without a trouble.

Figure 6:
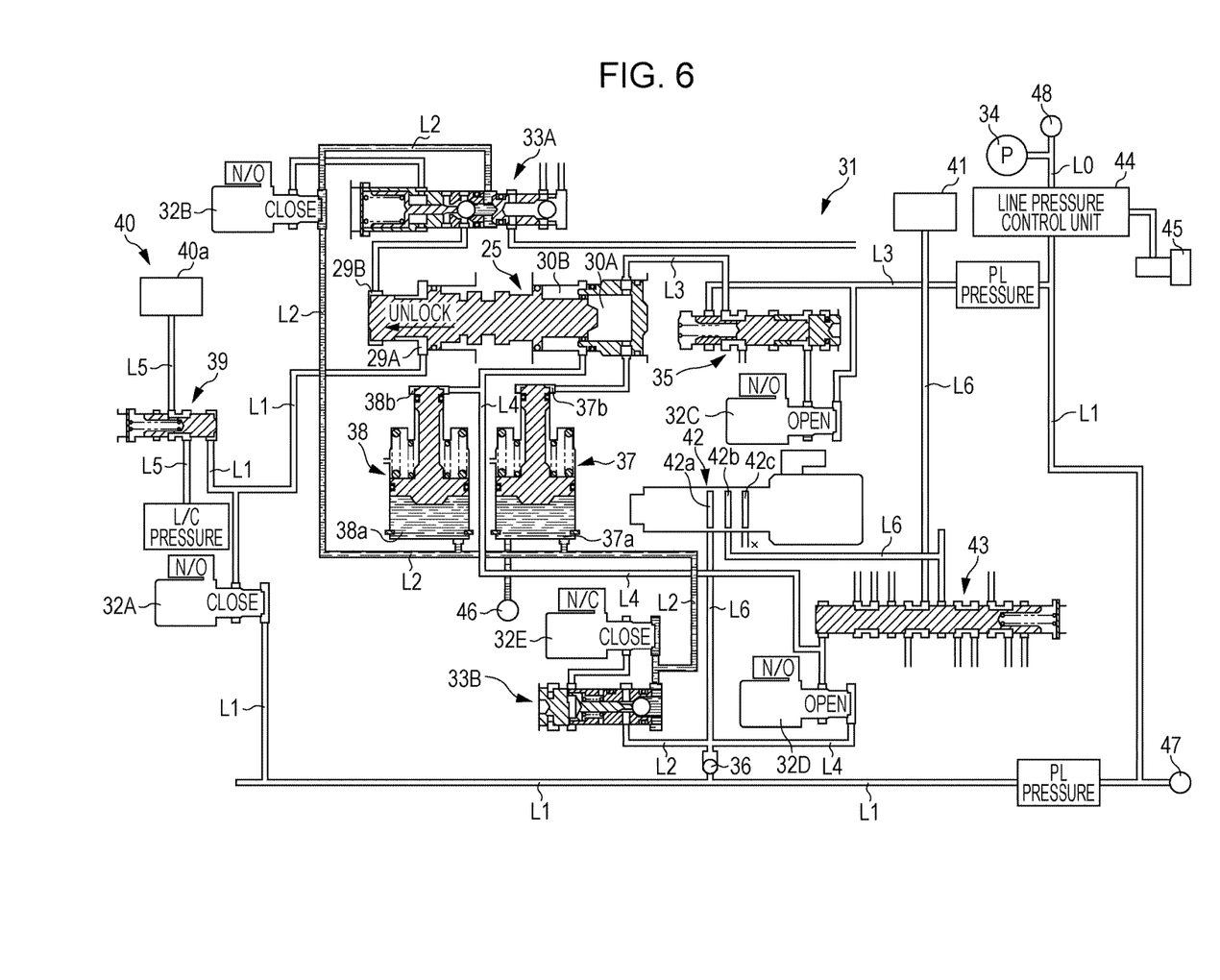
FIG. 6 is a diagram illustrating action taking place during idling stop control.

The vehicle according to the present embodiment is capable of performing idling stop control that causes line pressure to disappear when the engine is stopped for a temporary stop such as a stop for traffic light. As illustrated in FIG. 6, during the period of the idling stop control, the normal close type solenoid valve 32E is deenergized to close, the second ball valve 33B is closed in response thereto, and thereby hydraulic pressure accumulated in the first accumulator 37 and the second accumulator 38 is maintained without leakage. Although the disappearance of line pressure causes disappearance of hydraulic pressure in the first unlocking oil chamber 30A and the second unlocking oil chamber 30B of the hydraulic actuator 25, parking lock is maintained in operation release state with the detent plate 17 and the detent roller 22 engaged with each other.

Since line pressure does not rise up immediately even when the engine is started during recovery from the idling stop control, hydraulic pressure may not be supplied to the hydraulic brake 41 that is a hydraulic engaging device necessary for starting, and thereby quick starting may be hindered. However, according to the present embodiment, the hydraulic brake 41 may be operated with hydraulic pressure maintained in the first accumulator 37 and the second accumulator 38 during the idling stop control, without causing a delay.

Figure 7:
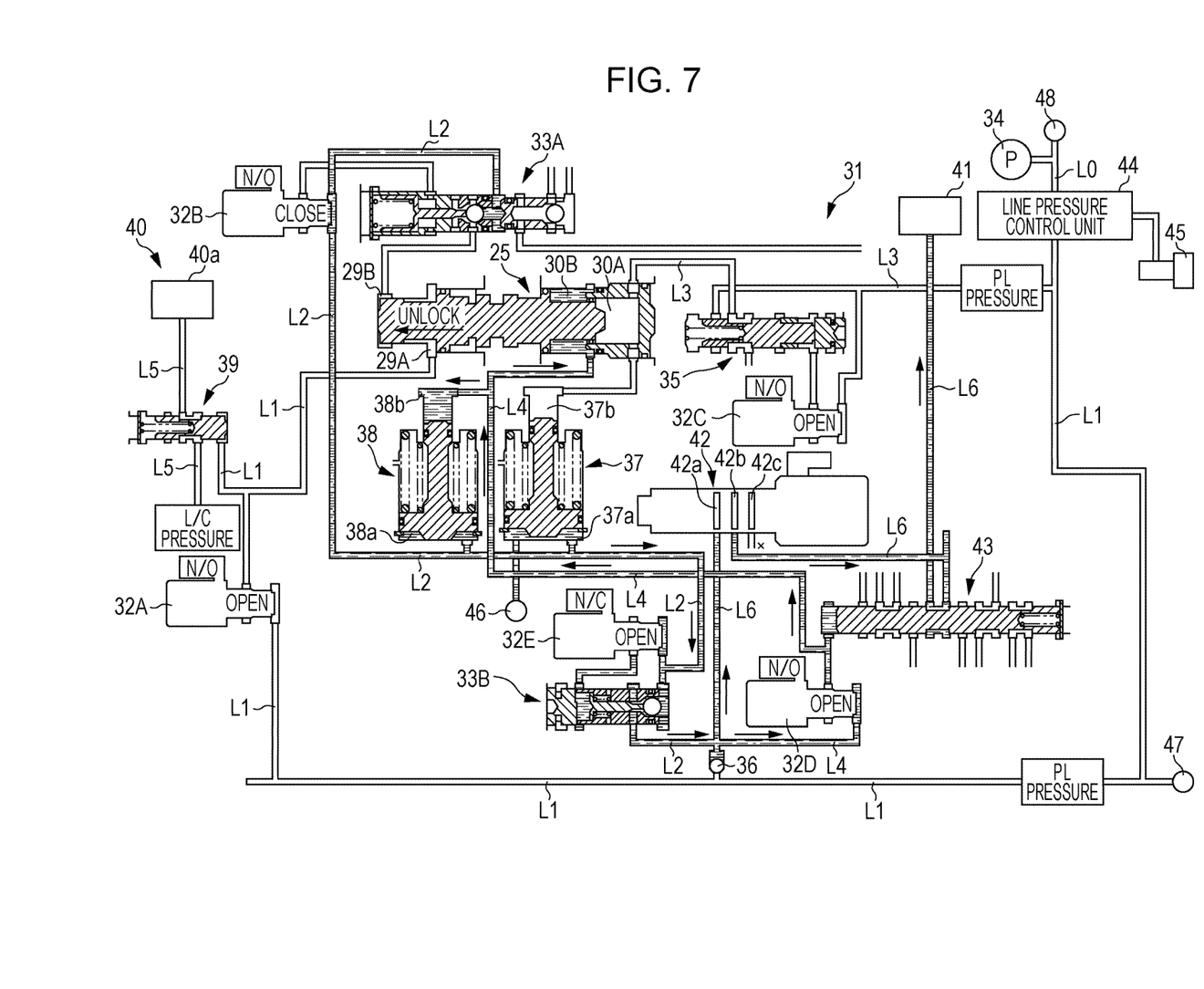
FIG. 7 is a diagram illustrating actions taking place when recovering from idling stop control.

That is, as illustrated in FIG. 7, upon recovery from the idling stop control, the solenoid valve 32E is energized to open and thereby the second ball valve 33B is opened. This causes hydraulic pressure accumulated in the first accumulator 37 and the second accumulator 38 to be supplied from the oil passage L2 to the oil passages L4 and L6 via the second ball valve 33B. In this case, since the solenoid valve 32D interposed in the oil passage L4 is deenergized to close, the spool of the brake cut valve 43 is operated to the right. Therefore, by opening the linear solenoid valve 42 interposed in the oil passage L6 to a predetermined angle, hydraulic pressure accumulated in the first accumulator 37 and the second accumulator 38 may be supplied to the hydraulic brake 41 to start the vehicle quickly.

Although flow rate of oil allowed to pass through the solenoid valve 32E is relatively low, flow rate of oil allowed to pass through the second ball valve 33B opened and closed by the solenoid valve 32E is relatively high. Therefore, by interposing the second ball valve 33B, responsiveness of hydraulic pressure supply from the first accumulator 37 and the second accumulator 38 may be enhanced, and the hydraulic brake 41 may be engaged quickly.

Although operation of the hydraulic brake 41 during recovery from the idling stop control is described above, even when the vehicle is traveling, the hydraulic brake 41 also may be controlled by operating the brake cut valve 43 with the solenoid valve 32D. When the spool of the brake cut valve 43 is operated to the left to close the solenoid valve 32D in order to shut off communication between the linear solenoid valve 42 and the hydraulic brake 41, supply of hydraulic pressure to the second unlocking oil chamber 30B of the hydraulic actuator 25 is shut off, but there is no possibility that parking lock is activated, since the hydraulic actuator 25 is maintained at the unlock position by hydraulic pressure supplied to the first unlocking oil chamber 30A.

According to the present embodiment, the solenoid valve 32A for operating the hydraulic actuator 25 is used to operate a lockup clutch 40a of the torque converter 40. That is, as illustrated in FIG. 3, when the vehicle is traveling, the solenoid valve 32A is closed, and the spool of the lockup clutch shift valve 39 is operated to the right to supply lockup clutch pressure to the lockup clutch 40a of the torque converter 40. When the solenoid valve 32A is deenergized to open in this state, the spool of the lockup clutch shift valve 39 is operated to drain hydraulic pressure of the lockup clutch 40a and thereby release engagement of the lockup clutch 40a.

When the solenoid valve 32A is opened, line pressure is supplied to the second locking oil chamber 29B of the hydraulic actuator 25. However, since line pressure is supplied to both of the first unlocking oil chamber 30A and the second unlocking oil chamber 30B, even when line pressure is supplied to the first locking oil chamber 29A, the piston 27 of the hydraulic actuator 25 is not shifted to the locking position and there is no possibility that parking lock is activated.

According to the present embodiment described above, the solenoid valves 32A and 32D that control operation of the hydraulic actuator 25 are also used to control the lockup clutch 40a of the torque converter 40 and to control the hydraulic brake 41 respectively. This reduces the number of solenoid valves and simplifies structure of the hydraulic circuit 31. Further, the first accumulator 37 and the second accumulator 38 are used not only for activation of parking lock but also for operation of the hydraulic brake 41 that serves as a hydraulic engaging device during recovery from idling stop control. This reduces the number of accumulators and further simplifies structure of the hydraulic circuit 31.

Meanwhile, when ignition is turned off, the shift lever is automatically shifted to the P range by shift-by-wire control, then the hydraulic actuator 25 is moved to the lock position by hydraulic pressure accumulated in the first accumulator 37 and the second accumulator 38, and thereby parking lock is activated (see FIG. 5). When ignition is turned on in this state and the shift lever is operated to the D range or the R range, the hydraulic actuator 25 is moved to the unlock position by line pressure and thereby parking lock is released and pressure is accumulated in the first accumulator 37 and the second accumulator 38 (see FIG. 3).

It takes a predetermined time period to fully fill up the first accumulator 37 and the second accumulator 38 after ignition has been turned on to start the engine and start pressure accumulation in the first accumulator 37 and the second accumulator 38 by line pressure generated by the hydraulic pump 34 driven by the engine. However, if ignition is turned off again before elapse of the time period, pressure accumulation in the first accumulator 37 and the second accumulator 38 is suspended before the accumulators are fully filled up, and thereby there is a possibility that parking lock is not activated.

Figure 8:
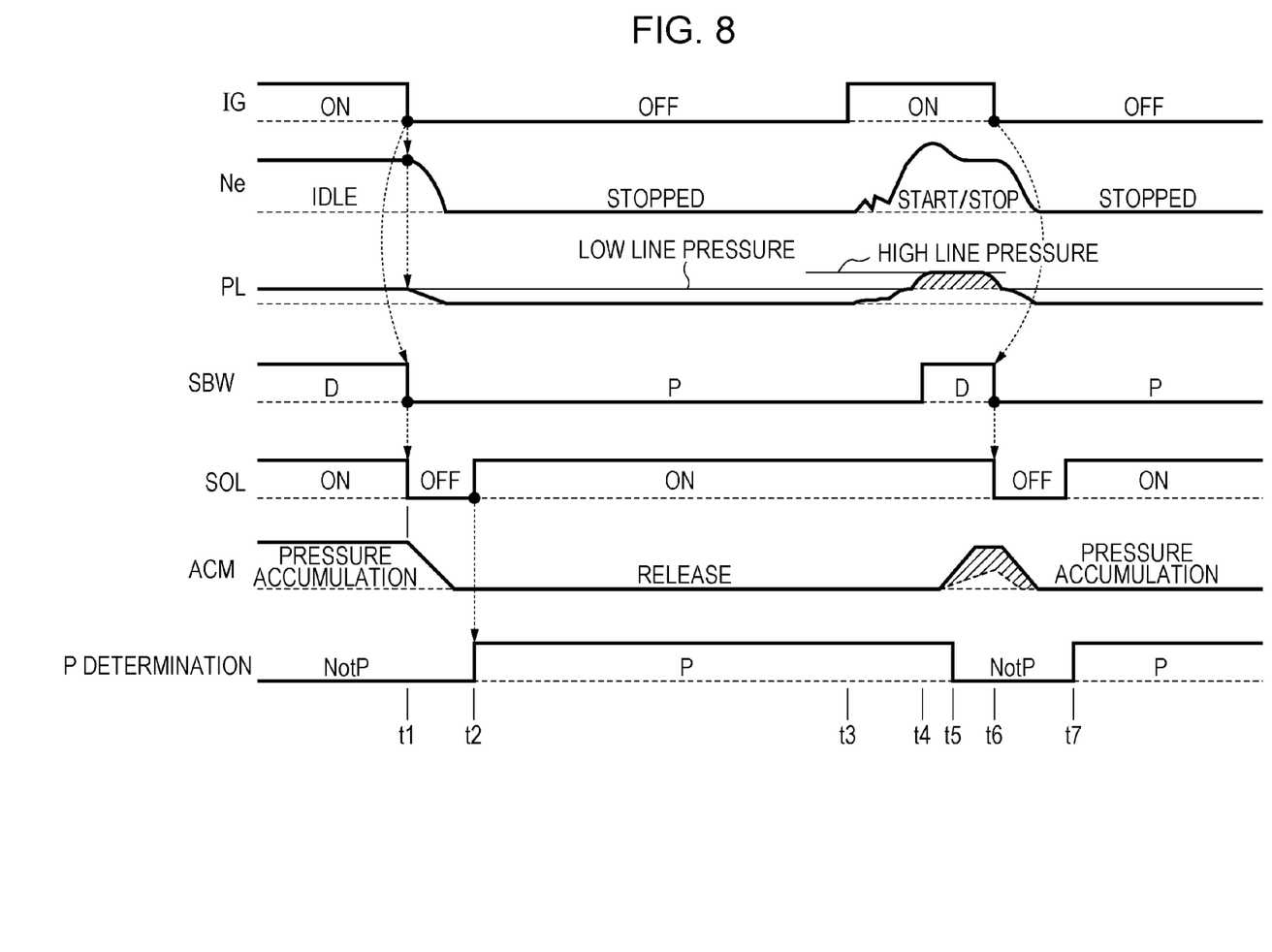
FIG. 8 is a time chart for illustrating actions in the embodiment.

FIG. 8 is a time chart illustrating actions which take place when ignition is turned on and off in short time intervals. When ignition is turned off at a time t1, the engine is stopped, line pressure of normal low pressure disappears, instruction of shift-by-wire control automatically changes the D position to the P position, and simultaneously, the always-open solenoid valves 32A, 32B of the hydraulic circuit 31 are deenergized to open. As a result, hydraulic pressure accumulated in the first accumulator 37 and the second accumulator 38 is supplied to the hydraulic actuator 25 to automatically activate parking lock (see FIG. 5).

After elapse of a predetermined time necessary for automatic activation of parking lock from the time t1, at a time t2, the solenoid valves 32A, 32B are energized to close for shifting to a next travel range, and determination of the parking lock state changes from parking lock release to parking lock activation. In this state, the engine is stopped, line pressure becomes zero, and the first accumulator 37 and the second accumulator 38 are in a released state with hydraulic pressure consumed.

When ignition is turned on again at a subsequent time t3, the engine is started and line pressure rises. If the driver operates the shift lever to the D range immediately thereafter at a time t4, parking lock is released at a time t5 and the vehicle is ready to start (see FIG. 3). Since the solenoid valves 32A, 32B have been energized to close, pressure accumulation in the first accumulator 37 and the second accumulator 38 with line pressure is started.

If the driver cancels starting and turns off ignition at a time t6 with a sufficient time not elapsed after the time t3 when ignition is turned on, conventional low line pressure (see broken line) is not sufficient to fully accumulate pressure in the first accumulator 37 and the second accumulator 38 (see broken line), and there is a possibility that parking lock is not activated with hydraulic pressure of the first accumulator 37 and the second accumulator 38.

However, according to the present embodiment, when a predetermined condition is satisfied, boost control for boosting line pressure to a level higher than a normal value is performed by the line pressure control unit 44, and this makes possible to fully accumulate the first accumulator 37 and the second accumulator 38 with pressure in a short time while the engine is running. Consequently, parking lock may be activated at a time t7 with hydraulic pressure accumulated in the first accumulator 37 and the second accumulator 38 without a trouble.

The above failure, that occurs when ignition is turned off immediately after turn-on thereof, occurs when oil temperature of hydraulic oil is too low or too high. This is because that when oil temperature of hydraulic oil is too low, flowability of hydraulic oil deteriorates due to high viscosity of hydraulic oil, and thereby a time lag occurs in pressure accumulation and release in the first accumulator 37 and the second accumulator 38. Also, when temperature of hydraulic oil is too high, leakage through a gap in a sealed section and so on increases and thereby pressure accumulation in the first accumulator 37 and the second accumulator 38 takes a time.

Figure 9:
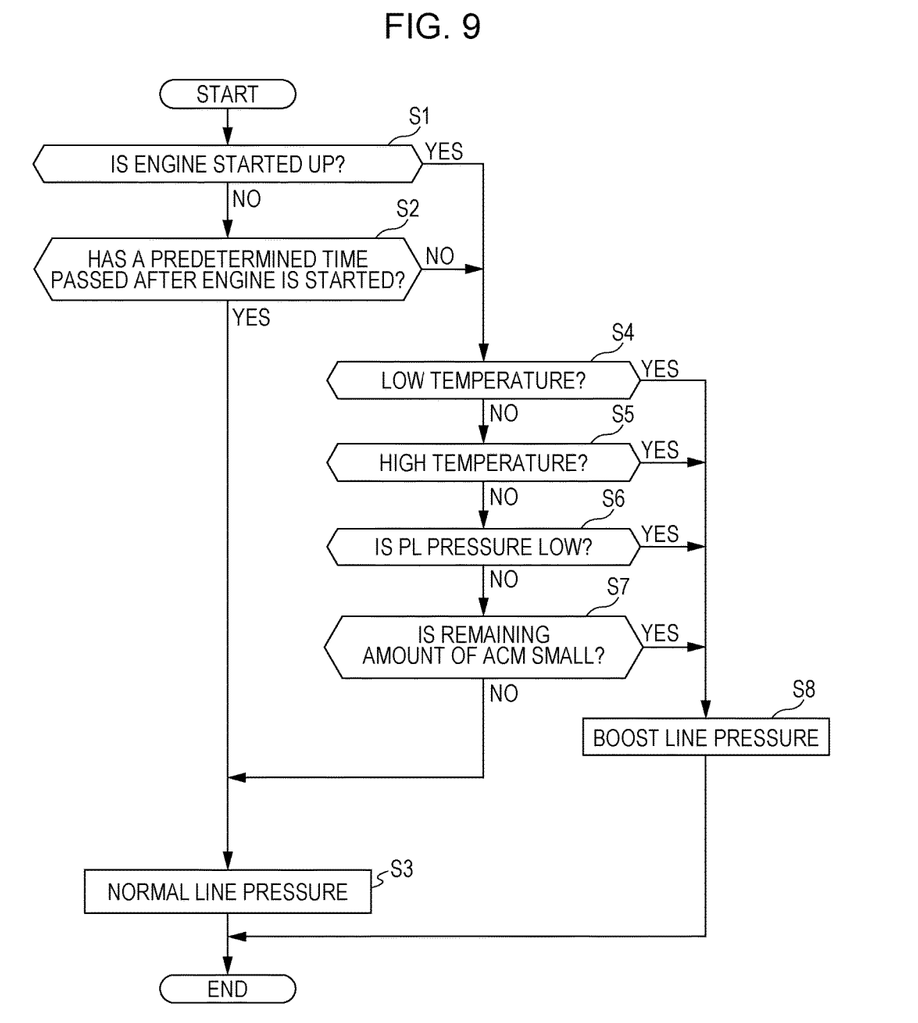
FIG. 9 is a flowchart for illustrating actions in the embodiment.

Next, the predetermined condition for performing boost control of the line pressure by the line pressure control unit 44 is further described with reference to a flowchart of FIG. 9.

First, when the engine is not started in the step S1 and a predetermined time has elapsed since the engine has been started in the step S2, in the step S3, line pressure is controlled to a normal low pressure by the line pressure control unit 44. A normal line pressure is a pressure slightly higher than a pressure when the first accumulator 37 and the second accumulator 38 are fully filled up. The predetermined time is a time sufficient for fully filling up the first accumulator 37 and the second accumulator 38 even under adverse conditions such as excessively low or excessively high oil temperature.

When the engine is started in the step S1 or when a predetermined time has not elapsed after the engine is started in the step S2, if oil temperature detected by the oil temperature sensor 48 in the step S4 is lower than or equal to a lower limit value, in the step S8, the line pressure is boosted to a value higher than the normal line pressure by the line pressure control unit 44. When oil temperature detected by the oil temperature sensor 48 in the step S5 is higher than or equal to an upper limit value, in the step S8, the line pressure is boosted to a value higher than the normal line pressure by the line pressure control unit 44. Thus, when pressure accumulation in the first accumulator 37 and the second accumulator 38 is likely to delay due to an oil temperature being outside the predetermined range, it is possible to quickly accumulate pressure into the first accumulator 37 and the second accumulator 38 by boosting the line pressure.

If internal pressure of the first accumulator 37 and the second accumulator 38 detected by the accumulator pressure sensor 46 in the step S6 is lower than or equal to a predetermined value, in the step S8, the line pressure is boosted to a value higher than the normal line pressure by the line pressure control unit 44. When line pressure detected by the line pressure sensor 47 in the step S7 is lower than or equal to a second predetermined value, in the step S8, the line pressure is boosted to a value higher than the normal line pressure by the line pressure control unit 44. Thus, pressure may be accumulated in the first accumulator 37 and the second accumulator 38 in an appropriate manner by determining pressure accumulation state in the first accumulator 37 and the second accumulator 38 in a reliable manner.

When a predetermined time has elapsed in the step S2 during boost control of the line pressure according to the step S4 to the step S7, the line pressure is restored to a normal value by the line pressure control unit 44 in the step S3. Thus, time for performing boost control of the line pressure may be reduced to a necessary minimum and thereby fuel consumption of the engine may be saved.

As described above, according to the present embodiment, when the engine is started with the first accumulator 37 and the second accumulator 38 in a released state, the line pressure is boosted to quickly accumulate pressure in the first accumulator 37 and the second accumulator 38. Thus, even when the engine is stopped immediately after start-up thereof, parking lock may be activated by hydraulic pressure accumulated by that time in the first accumulator 37 and the second accumulator 38 without a trouble. In particular, since the line pressure is boosted when oil temperature is outside a predetermined range and pressure accumulation in the first accumulator 37 and the second accumulator 38 is likely to delay, boost control of necessary line pressure is performed in an appropriate manner.

Although embodiments of the present disclosure are described above, various design modifications to the present disclosure is possible within a scope not deviating from the spirit thereof.

For example, the drive source according to the present disclosure is not limited to the engine, and may be an electric motor.

Although the vehicle parking lock device according to the embodiments includes the first accumulator 37 and the second accumulator 38, the number of accumulators may be one or three or more.

According to a first aspect of the present disclosure, a vehicle parking lock device is proposed, including: an automatic transmission that outputs a drive force from the drive source while changing speed, the automatic transmission including a hydraulic actuator capable of restricting rotation of a parking gear coupled to a wheel, and a hydraulic circuit configured to control operation of the hydraulic actuator, in which the hydraulic circuit includes an accumulator in which pressure is accumulated with line pressure generated by running of the drive source, when the drive source is stopped in a running state, the hydraulic circuit supplies hydraulic pressure accumulated in the accumulator to the hydraulic actuator to operate the hydraulic actuator to the parking lock activation position, and when the drive source is started in a stopped state, the hydraulic circuit accumulates pressure in the accumulator with the line pressure, where the hydraulic circuit further includes a line pressure control unit capable of adjusting the line pressure. When a predetermined condition is satisfied after the drive source is started in the stopped state, the line pressure control unit boosts the line pressure to a level higher than or equal to a pressure necessary to fully fill up the accumulator.

According to a second aspect of the present disclosure, in addition to the configuration according to the first aspect, the vehicle parking lock device may be configured such that the vehicle parking lock device further includes: an oil temperature sensor configured to detect oil temperature of hydraulic oil in the hydraulic circuit, where when the oil temperature is outside a predetermined range, the vehicle parking lock device determines that the predetermined condition is satisfied, and boosts the line pressure.

According to a third aspect of the present disclosure, in addition to the configuration according to the first aspect, the vehicle parking lock device may be configured such that the vehicle parking lock device further includes: a first hydraulic pressure sensor configured to detect internal pressure of the accumulator, where when the internal pressure is lower than or equal to a predetermined value, the vehicle parking lock device determines that the predetermined condition is satisfied, and boosts the line pressure.

According to a fourth aspect of the present disclosure, in addition to the configuration according to the first aspect, the vehicle parking lock device may be configured such that the vehicle parking lock device further includes: a second hydraulic pressure sensor configured to detect the line pressure, where when the internal line pressure is lower than or equal to a predetermined value, the vehicle parking lock device determines that the predetermined condition is satisfied, and boosts the line pressure.

According to a fifth aspect of the present disclosure, in addition to a configuration according to the first to fourth aspects, the vehicle parking lock device may be configured such that the vehicle parking lock device ends boost control of the line pressure upon elapse of a predetermined time after boost control of the line pressure starts, or when the predetermined condition is not satisfied.

A first accumulator 37 and a second accumulator 38 according to an embodiment correspond to the accumulator according to the present disclosure, an accumulator pressure sensor 46 according to the embodiment corresponds to the first hydraulic pressure sensor according to the present disclosure, and a line pressure sensor 47 according to the embodiment corresponds to the second hydraulic pressure sensor according to the present disclosure.

According to a configuration of the first aspect of the present disclosure, the hydraulic circuit configured to control operation of the hydraulic actuator capable of restricting rotation of the parking gear of the automatic transmission includes the accumulator in which pressure is accumulated with the line pressure generated by running of the drive source. When the drive source is stopped in a running state, the hydraulic circuit supplies hydraulic pressure accumulated in the accumulator to the hydraulic actuator to activate the parking lock, and when the drive source is started in a stopped state, the hydraulic circuit accumulates the accumulator with the line pressure. Thus, when the drive source is started and the shift range is operated to the drive range in a state where the drive source is stopped and parking lock is activated, parking lock is released by the line pressure and simultaneously pressure accumulation in the accumulator with the line pressure starts. Then, when the drive source is stopped again immediately after start-up thereof, parking lock is caused to be activated by hydraulic pressure accumulated in the accumulator before the accumulator is fully accumulated. Thus, there is a possibility that parking lock is not activated due to insufficient pressure accumulation in the accumulator.

According to the first aspect, however, high line pressure rises up immediately after the drive source is started, and the accumulator is fully filled up in a short time. Thus, even when the drive source is stopped again immediately after start-up thereof, parking lock is activated by hydraulic pressure accumulated in the accumulator without a trouble.

According to the configuration of the second aspect, when viscosity becomes too high due to low oil temperature of hydraulic oil and thereby flowability of hydraulic oil deteriorates and the hydraulic actuator is unlikely to operate, or when viscosity becomes too low due to high oil temperature of hydraulic oil and thereby hydraulic pressure drops due to leakage of hydraulic oil and the hydraulic actuator is unlikely to operate, pressure can be accumulated in the accumulator quickly by performing boost control of line pressure in an appropriate manner.

According to the configuration of the third aspect, boost control of the line pressure can be performed in an appropriate manner by determining accumulation state of the accumulator in a reliable manner.

According to the configuration of the fourth aspect, boost control of the line pressure can be performed in an appropriate manner by determining accumulation state of the accumulator in a reliable manner.

According to the configuration of the fifth aspect, time for performing boost control of the line pressure can be reduced to a necessary minimum and thereby fuel consumption and electric power consumption of the drive source may be saved.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle parking lock device comprising:
    an automatic transmission that outputs a drive force from a drive source while changing speed, the automatic transmission including a hydraulic actuator capable of restricting rotation of a parking gear coupled to a wheel, and a hydraulic circuit configured to control operation of the hydraulic actuator, in which
    the hydraulic circuit includes an accumulator in which pressure is accumulated with line pressure generated by running of the drive source,
    when the drive source is stopped in a running state, the hydraulic circuit supplies hydraulic pressure accumulated in the accumulator to the hydraulic actuator to operate the hydraulic actuator to a parking lock activation position, and
    when the drive source is started in a stopped state, the hydraulic circuit accumulates pressure in the accumulator with the line pressure, wherein
    the hydraulic circuit further includes a line pressure control unit capable of adjusting the line pressure, and
    when a predetermined condition is satisfied after the drive source is started in the stopped state, the line pressure control unit boosts the line pressure to a level higher than or equal to a pressure necessary to fully fill up the accumulator.

2. The vehicle parking lock device according to claim 1, further comprising:
    an oil temperature sensor configured to detect oil temperature of hydraulic oil in the hydraulic circuit, wherein
    when the oil temperature is outside a predetermined range, the vehicle parking lock device determines that the predetermined condition is satisfied, and boosts the line pressure.

3. The vehicle parking lock device according to claim 1, further comprising:

a first hydraulic pressure sensor configured to detect internal pressure of the accumulator, wherein when the internal pressure is lower than or equal to a predetermined value, the vehicle parking lock device determines that the predetermined condition is satisfied, and boosts the line pressure.

4. The vehicle parking lock device according to claim 1, further comprising:

a second hydraulic pressure sensor configured to detect the line pressure, wherein when the internal line pressure is lower than or equal to a predetermined value, the vehicle parking lock device determines that the predetermined condition is satisfied and boosts the line pressure.

5. The vehicle parking lock device according to claim 1, wherein the vehicle parking lock device ends boost control of the line pressure upon elapse of a predetermined time after boost control of the line pressure starts, or when the predetermined condition is not satisfied.

6. A vehicle parking lock device comprising:

an automatic transmission to transmit a drive force from a drive source, the automatic transmission comprising:

a hydraulic actuator to restrict rotation of a parking gear coupled to a wheel; and a hydraulic circuit via which the hydraulic actuator is controlled, the hydraulic circuit comprising:

an accumulator in which pressure is accumulated with line pressure generated by driving the drive source, hydraulic pressure accumulated in the accumulator being supplied to the hydraulic actuator so that the hydraulic actuator is in a parking lock activation position when the drive source has stopped, pressure in the accumulator being accumulated with the line pressure when the drive source has started; and a line pressure controller to boost the line pressure to a level higher than or equal to a pressure necessary to fully fill up the accumulator in a case where a predetermined condition is satisfied after the drive source has started.

7. The vehicle parking lock device according to claim 6, further comprising:

an oil temperature sensor configured to detect oil temperature of hydraulic oil in the hydraulic circuit, wherein when the oil temperature is outside a predetermined range, the vehicle parking lock device determines that the predetermined condition is satisfied, and boosts the line pressure.

8. The vehicle parking lock device according to claim 6, further comprising:

a first hydraulic pressure sensor configured to detect internal pressure of the accumulator, wherein when the internal pressure is lower than or equal to a predetermined value, the vehicle parking lock device determines that the predetermined condition is satisfied, and boosts the line pressure.

9. The vehicle parking lock device according to claim 6, further comprising:

a second hydraulic pressure sensor configured to detect the line pressure, wherein when the internal line pressure is lower than or equal to a predetermined value, the vehicle parking lock device determines that the predetermined condition is satisfied and boosts the line pressure.

10. The vehicle parking lock device according to claim 6, wherein the vehicle parking lock device ends boost control of the line pressure upon elapse of a predetermined time after boost control of the line pressure starts, or when the predetermined condition is not satisfied.

11. The vehicle parking lock device according to claim 6, wherein the parking gear is fixed on a transmission shaft of the automatic transmission.

12. The vehicle parking lock device according to claim 6, wherein the line pressure controller configured to boost the line pressure to a second level in an case where the drive source is not started wherein the first level is higher than the second level.

* * * * *